United States Patent
Oldham et al.

(10) Patent No.: US 9,304,787 B2
(45) Date of Patent: Apr. 5, 2016

(54) LANGUAGE PREFERENCE SELECTION FOR A USER INTERFACE USING NON-LANGUAGE ELEMENTS

(71) Applicant: Google Inc., Mountain View, CA (US)

(72) Inventors: Jeffrey David Oldham, San Jose, CA (US); Mark Edward Davis, Zurich (CH); Chinglan Ho, Palo Alto, CA (US); Cibu Chalissery Johny, Santa Clara, CA (US); Markus Scherer, Santa Clara, CA (US); Jungshik Shin, Sunnyvale, CA (US); Erik Menno van der Poel, Berkeley, CA (US); Neha Chachra, San Diego, CA (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 14/144,620

(22) Filed: Dec. 31, 2013

(65) Prior Publication Data
US 2015/0186357 A1    Jul. 2, 2015

(51) Int. Cl.
*G06F 9/44* (2006.01)
*G10L 15/00* (2013.01)
*G06F 17/27* (2006.01)

(52) U.S. Cl.
CPC ............ *G06F 9/4448* (2013.01); *G06F 17/275* (2013.01); *G10L 15/005* (2013.01)

(58) Field of Classification Search
None
See application file for complete search history.

(56) References Cited

U.S. PATENT DOCUMENTS

| | | | | |
|---|---|---|---|---|
| 5,865,626 A | * | 2/1999 | Beattie | G09B 19/04 434/185 |
| 8,442,827 B2 | | 5/2013 | Duffield | |
| 2002/0087315 A1 | * | 7/2002 | Lee | G06Q 30/06 704/9 |
| 2004/0054534 A1 | * | 3/2004 | Junqua | G10L 13/033 704/258 |
| 2011/0231528 A1 | | 9/2011 | Ishii | |
| 2012/0010886 A1 | | 1/2012 | Razavilar | |

FOREIGN PATENT DOCUMENTS

TW    201301058    1/2013

* cited by examiner

*Primary Examiner* — Jeremiah Bryar
(74) *Attorney, Agent, or Firm* — Remarck Law Group PLC (57) ABSTRACT

Described is a technique for establishing an interaction language for a user interface without having to communicate with the user in a default language, which the user may or may not understand. The technique may prompt the user for multiples responses in order to determine a specific language. The responses may include speech input or selecting particular regions on a map. In some implementations, the language may be precise to a particular dialect or variant preferred or spoken by the user. Accordingly, this approach provides an accurate and efficient method of providing a high degree of specificity for language selection without overwhelming the user with an unmanageable list of languages.

24 Claims, 11 Drawing Sheets

LANGUAGE PREFERENCE SELECTION FOR A USER INTERFACE USING NON-LANGUAGE ELEMENTS

BACKGROUND

Current computer interfaces support many languages. Accordingly, it is often difficult for a user to select an appropriate language from a potentially large number of selections especially in instances where a particular dialect or variant is desired. In addition, to account for instances where a language preference of the user is unknown, interfaces may present a list of languages written in their native scripts. When providing such a list, there is often no effective way of ordering the list, which adds to the burden of selecting a language. Accordingly, in order for a user to select a language with a certain degree of specificity, it is often necessary for a user to undertake an onerous selection process.

BRIEF SUMMARY

In an implementation, described is a computer-implemented method of establishing an interaction language for a user interface of a display. The method may include providing, on the user interface, non-language elements prompting a user to provide a first response and receiving, from the user, the first response. The non-language elements may include one or more ideograms. A language for the user may be determined based on the received first response. The method may also include providing, on the user interface, language elements in the determined language prompting the user to provide a second response and receiving, from the user, the second response. A sub-language of the determined language may be determined based on the received second response. The sub-language may be one of a dialect or a variant of the determined language.

In an implementation, described is a computer-implemented method of establishing an interaction language for a user interface of a display. The method may include providing, on the user interface, non-language elements prompting the user to provide a first response and determining a language for the user based on the first response provided by the user. The method may also include prompting, in the determined language, the user to provide a second response and determining a sub-language of the determined language based on the second response provided by the user. Prompting the user to provide the second response may include prompting the user to say a specific word and the second response received from the user may include the specific word as a speech input. In addition, the sub-language determined may include a regional variant of the determined language based on a pronunciation of the specified word as the speech input.

In an implementation, described is a device for establishing an interaction language for a user interface. The device may include a processor configured to provide, on the user interface of a display coupled to the device, non-language elements prompting a user to provide a first response and receive, from the user, the first response. A language for the user may be determined based on the received first response. The processor may also be configured to provide, on the user interface of the display, language elements in the determined language prompting the user to provide a second response and receive, from the user, the second response. A sub-language of the determined language may be determined based on the received second response.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a technique for establishing an interaction language for a user interface. More specifically, the technique may determine a user's language preference without relying on a default language or arbitrarily "guessing" a language familiar to the user. The technique may prompt the user for multiples responses in order to determine a specific language. The responses may include input from the user such as a speech input or other forms of input such as selecting a specific language or particular regions on a map. In some implementations, the precision of the language selection may be specific to a particular dialect or regional variant preferred or spoken by the user. Thus, the technique provides an accurate and efficient method of providing a high degree of specificity for language selection without overwhelming the user with an unmanageable list of languages.

In order to avoid the need to rely on a default language, which the user may not understand, the technique may display non-language elements in order to prompt the user for information. Based on the initial response, a language familiar to the user may be determined. The user interface may then display language elements in the determined language.

Accordingly, the interface does not need to guess or be biased towards a particular language. Once a language (or source language) is determined, the language elements may prompt the user to provide more specific information in a subsequent response. Based on the subsequent response, a sub-language with a degree of specificity may be determined. The sub-language may include a particular dialect or variant of a source language. For example, the device may determine that English is a language familiar to the user and the user may select one of British English or American English as a regional variant. Accordingly, a precise language may be defined as an interaction language for a user in an efficient manner.

Figure 1:
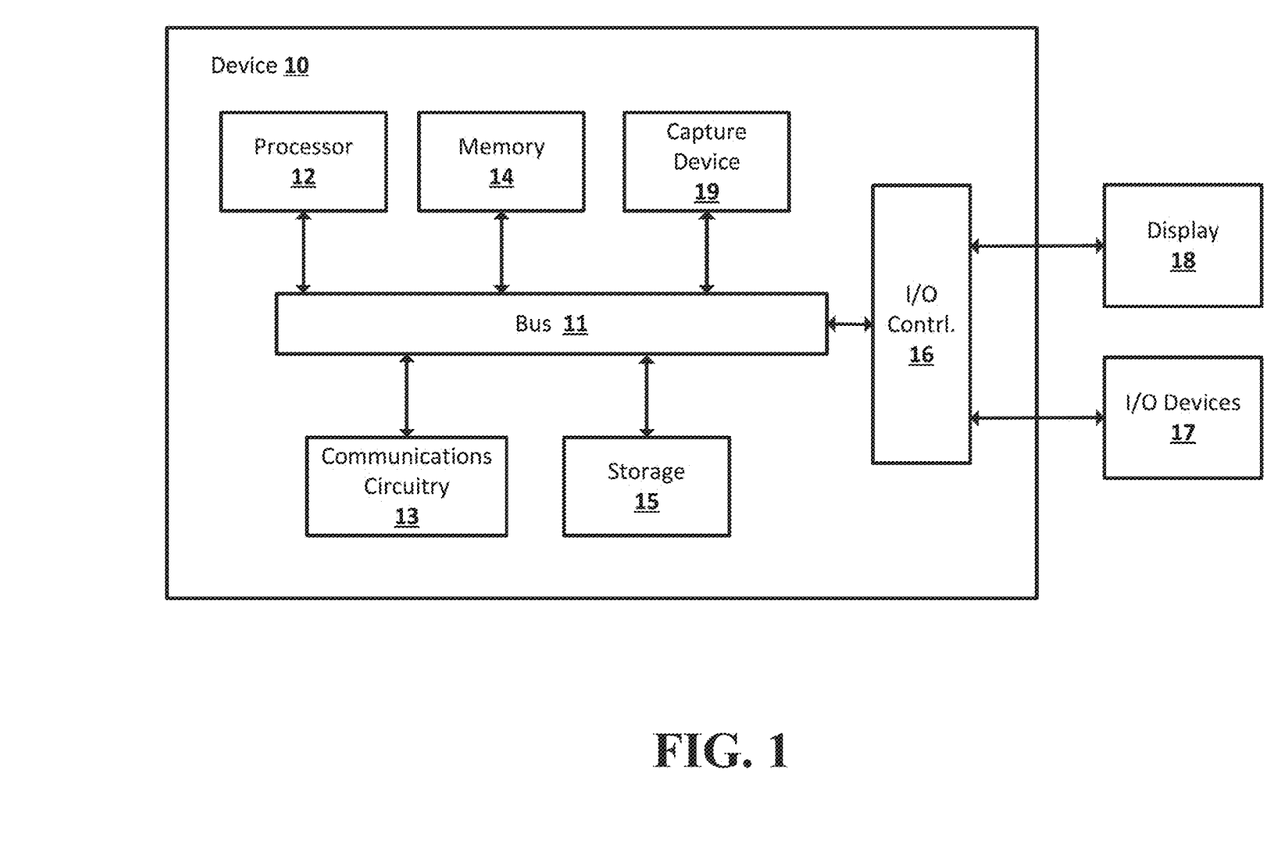
FIG. 1 illustrates a functional block diagram of a representative device according to an implementation of the disclosed subject matter.

FIG. 1 shows a functional block diagram of a representative device according to an implementation of the disclosed subject matter. The device 10 may include or be part of a variety of computing devices such as a personal computer, an interactive kiosk, a handheld device including a mobile phone or "smartphone," tablet computer, laptop, netbook, desktop, personal digital assistant ("PDA"), media device, set-top box, television, watch, or other type of device. The device 10 may include a bus 11, processor 12, memory 14, I/O controller 16, communications circuitry 13, storage 15, and a capture device 19. The device 10 may also include or may be coupled to a display 18 and one or more I/O devices 17.

The processor 12 may be any suitable programmable control device and may control the operation of one or more processes, such as language determination as discussed herein, as well as other processes performed by the device 10. The bus 11 may provide a data transfer path for transferring between components of the device 10. The memory 14 may include one or more different types of memory which may be accessed by the processor 12 to perform device functions. For example, the memory 14 may include any suitable non-volatile memory such as read-only memory (ROM), electrically erasable programmable read only memory (EEPROM), flash memory, and the like, and any suitable volatile memory including various types of random access memory (RAM) and the like.

The communications circuitry 13 may include circuitry for wired or wireless communications for short-range and/or long range communication. For example, the wireless communication circuitry may include Wi-Fi enabling circuitry for one of the 802.11 standards, and circuitry for other wireless network protocols including Bluetooth, the Global System for Mobile Communications (GSM), and code division multiple access (CDMA) based wireless protocols. Communications circuitry 13 may also include circuitry that enables the device 10 to be electrically coupled to another device (e.g. a computer or an accessory device) and communicate with that other device. For example, a user input component such as a wearable device may communicate with the device 10 through the communication circuitry 13 using a short-range communication technique such as infrared (IR) or other suitable technique.

The storage 15 may store software (e.g., for implementing various functions on device 10), and any other suitable data. The storage 15 may include a storage medium including various forms volatile and non-volatile memory. Typically, the storage 15 includes a form of non-volatile memory such as a hard-drive, solid state drive, flash drive, and the like. The storage 15 may be integral with the device 10 or may be separate and accessed through an interface to receive a memory card, USB drive, optical disk, a magnetic storage medium, and the like.

An I/O controller 16 may allow connectivity to a display 18 and one or more I/O devices 17. The I/O controller 16 may include hardware and/or software for managing and processing various types of I/O devices 17. The I/O devices 17 may include various types of devices allowing a user to interact with the device 10. For example, the I/O devices 17 may include various input components such as a keyboard/keypad, touch sensitive screen, controller (e.g. mouse, game controller, remote, etc.) including a smartphone that may act as a controller, a microphone, or other suitable component for providing input.

The device 10 may act a standalone unit that is coupled to a separate display 18, or the device 10 may be integrated with or be part of a display 18 (e.g. integrated into an interactive kiosk). When acting as standalone unit, the device 10 may be coupled to a display 18 through a suitable data connection including a network type connection or a wireless connection. The display 18 may be any suitable component for providing visual output such as a display screen, television, projector, and the like. The user interface may be displayed on the display 18 allowing a user to interact with the device. The user interface may include an entire screen of a display or may include portions of a screen such as one or more windows. For example, the user interface may include a particular application or a particular website displayed within a browser. In addition, the user interface may display elements including language elements and non-language elements as described further herein.

The device 10 may include a capture device 19. Alternatively, the device 10 may be coupled to the capture device 19 through the I/O controller 16. For example, the device 10 may include or be part of a remote device that receives data from a capture device 19 (e.g. webcam or similar component) that is local to the user. The capture device 19 enables the device 10 to capture still images, video, or both. The capture device 19 may include one or more cameras for capturing an image or series of images continuously, periodically, at select times, and/or under select conditions.

Figure 2:
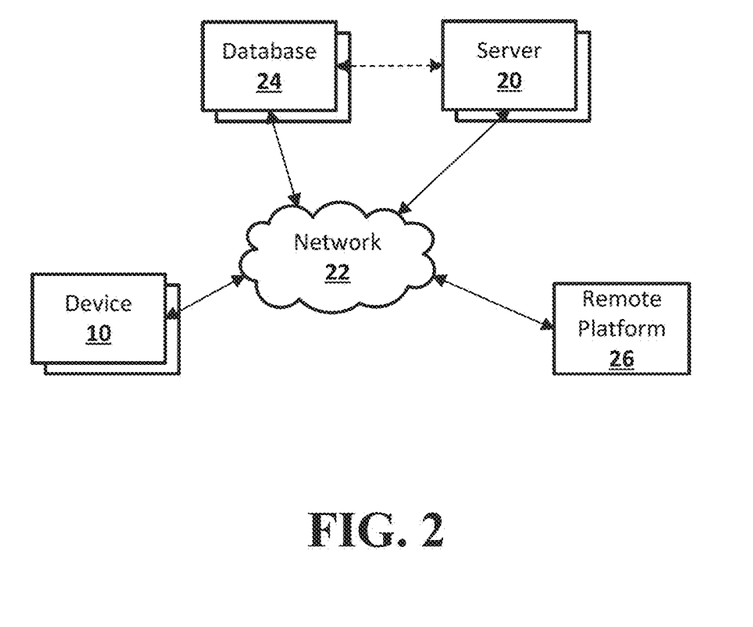
FIG. 2 illustrates a network arrangement according to an implementation of the disclosed subject matter.

FIG. 2 illustrates an example network arrangement according to an implementation of the disclosed subject matter. The devices 10 may communicate with other devices 10, a server 20, and a database 24 via the network 22. The network 22 may be a local network, wide-area network (including the Internet), and other suitable communications network. The network 22 may be implemented on any suitable platform including wired and wireless technologies. Server 20 may be directly accessible by one or more devices 10, or one or more other devices 10 may provide intermediary access to a server 20. Devices 10 and server 20 may access a remote platform 26 such as cloud computing arrangement or service. The remote platform 26 may include one or more servers 20 and databases 24. The term server may be used herein and may include a single server or one or more servers. For example, a server 20 may include one or more servers responsible for providing and/or storing language information.

Figure 3:
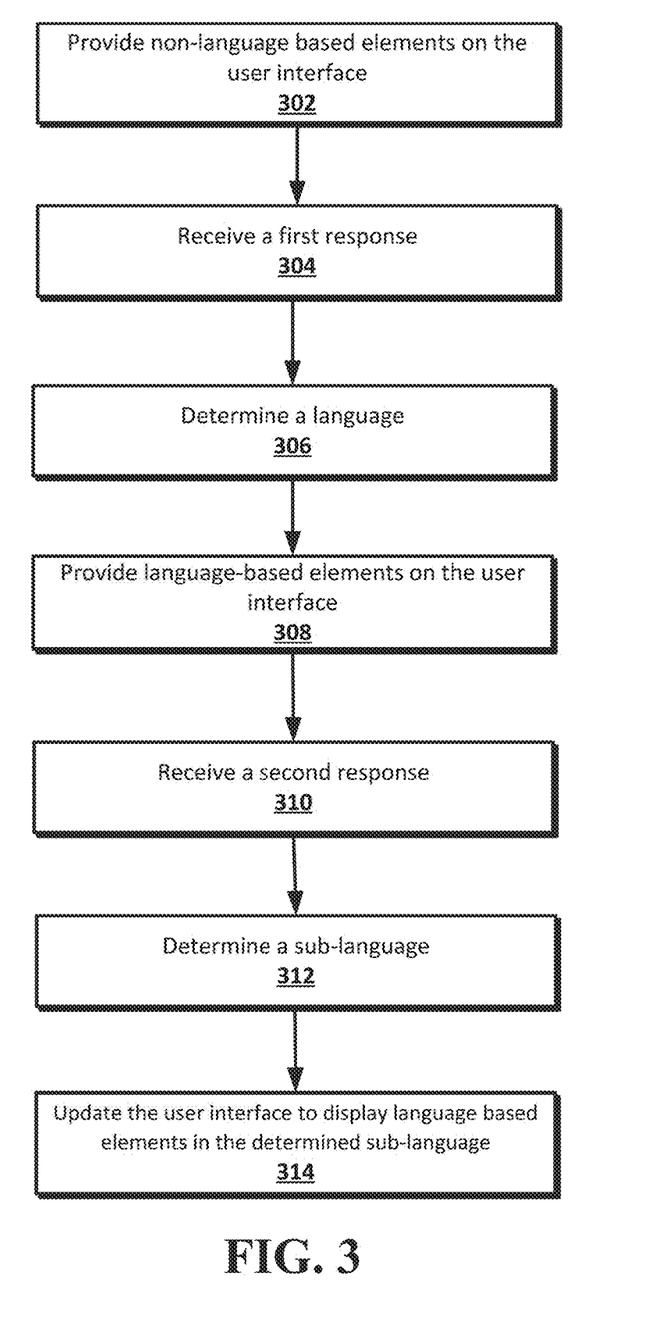
FIG. 3 illustrates a flow diagram of establishing an interaction language for a user interface of a display according to an implementation of the disclosed subject matter.

FIG. 3 illustrates a flow diagram of establishing an interaction language for a user interface of a display according to an implementation of the disclosed subject matter. In 302, a device may provide non-language elements to a user interface. The non-language elements may prompt a user to provide a first response. The non-language elements may utilize various techniques for communicating with the user without using language elements (e.g. words or characters in a particular language). For example, the non-language elements may include images, symbols, icons, animations, videos, or other visual techniques for communicating with the user and/or providing instructions to the user. In an implementation, these non-language elements may include ideograms such as graphic symbols that represent an idea or concept. Ideograms may convey meaning based on a familiarity with a prior convention. In addition, ideograms may convey their meaning through a pictorial resemblance to a physical object. These types of ideograms may also be known as pictograms and are more literal in form. It should be noted that ideograms as described herein represent ideas rather than words and are distinguished from morphemes, which may be used, for example, in certain symbolic-type language systems (e.g. Chinese language families).

The non-language elements may prompt the user to provide a first response in various ways. The prompt may include providing an indication for the user to speak. For example, non-language elements may be an icon of a microphone or a sound wave. The interface may use known conventions based on the interface itself. For example, a user may be familiar with one or more conventions prompting a user to speak such as an icon or a particular sound notification that is specific to a particular interface (e.g. operating system interface). In another example, an icon providing a graphical representation of a user speaking may also be used. Similarly, a video or animated clip may show a person speaking. For example, an animation or a video of a user speaking may indicate to the user to provide a speech input.

Figure 4:
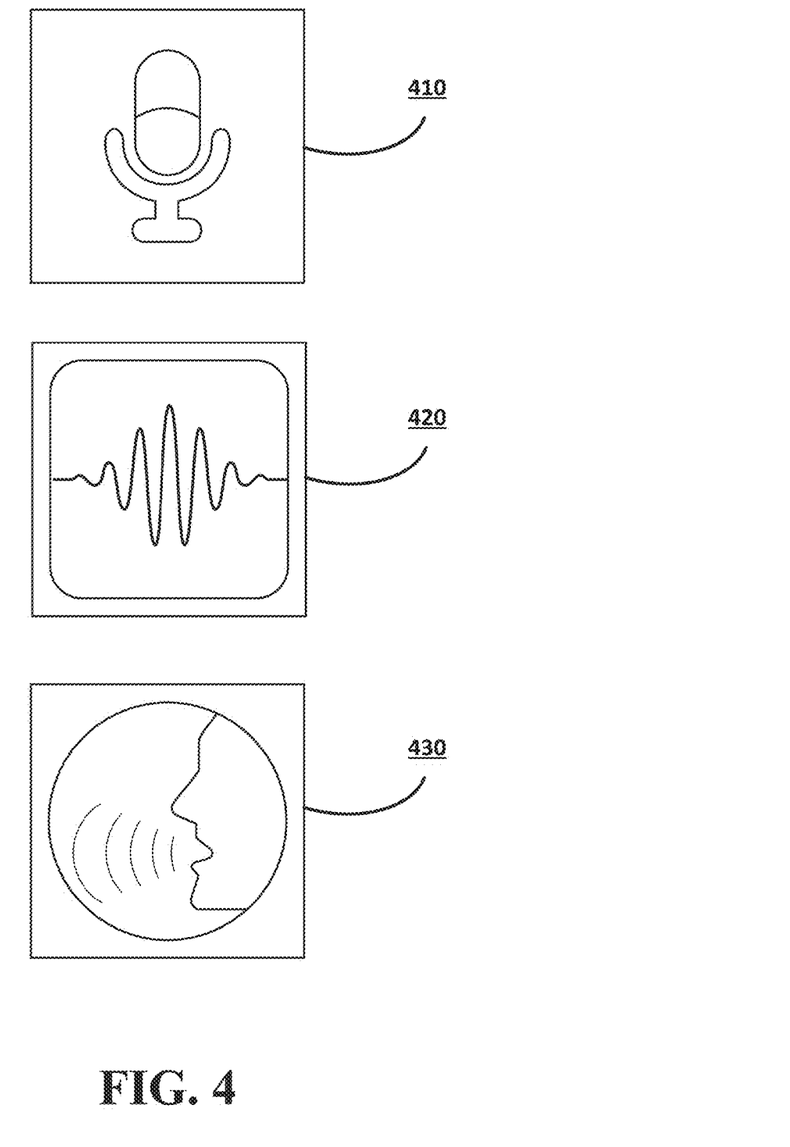
FIG. 4 illustrates examples of ideograms that may be used as non-language elements according to an implementation of the disclosed subject matter.

FIG. 4 illustrates examples of ideograms that may be used as non-language elements according to an implementation of the disclosed subject matter. As shown various forms of symbolic representations may be used as ideograms. For example, as shown in 410 an image resembling a microphone may provide an indication to the user to provide a speech input. In another example, 420 shows an example of a sound wave providing an indication that a speech input may be provided. In yet another example, 430 shows an example of a face with sound emanating from the mouth to provide a more pictorial (e.g. pictogram) type example. These ideograms may be static or dynamic. In addition, these images may provide an indication that a speech input is recognized by the device. For example, sound wave 420 may fluctuate as the user speaks to provide an indication that the speech input is being received.

Returning to FIG. 3, the non-language elements may also prompt the user to provide a response in other ways such as selecting an element on the user interface. The element may represent a source language. For example, the non-language elements may include a map. The map may include selectable regions for the user to select. The regions may be highlighted or utilize another technique to provide an indication that the user may select a region from which the user may reside, and thus, be familiar with the language. For example, an animation or cursor selecting a region within the map may provide an to the user to select a region on the map.

Figure 5:
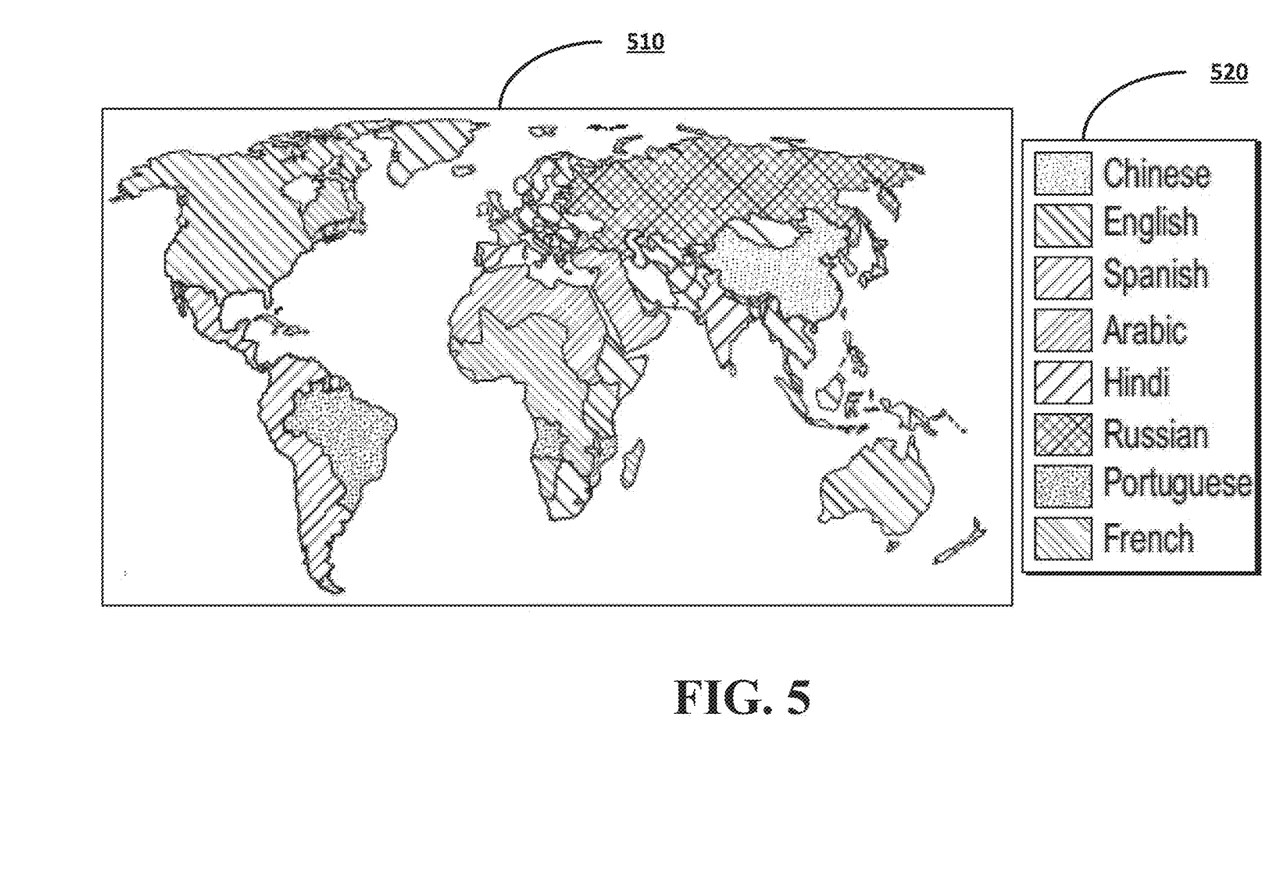
FIG. 5 illustrates an example of a map delimited into regions based on languages spoken within the regions according to an implementation of the disclosed subject matter.

FIG. 5 illustrates an example of a map delimited into regions based on languages spoken within the regions according to an implementation of the disclosed subject matter. In this example, a world map 510 may be delineated into regions based on major languages 520. These languages may represent the most popular or most selected languages. These major languages 520 may correspond to a language or a source language as described herein.

In an implementation, the user interface may not display any language elements as part of the prompting the user to provide a response. It should be noted that other elements on the screen that are not responsible for conveying the prompting may include language elements, but may be ancillary to the elements prompting the user to provide a response. Accordingly, prompting the user to provide a response may substantially include only non-language elements. For example, ancillary elements such as a menu button that includes an "X" and other elements such as a trademarked name of the device or operating system may be displayed on the user interface. Accordingly, these ancillary elements would, to a person of ordinary skill in the art, not be considered part of the elements that are responsible for prompting the user to provide a response.

In 304, the user may provide a first response based on the particular type of prompt provided by the non-language elements in 302. As described, the first response may include a speech input or a physical input such as an input selection. The user may utter a specific word or sentence in response to the prompt, which may provide information regarding a source language. For example, the user may be prompted to specify a particular language. For instance, the user may specify a particular language (e.g. "Espanol") or say any other word that may be interpreted by the device. The prompt may also provide an indication for a user to describe an image or other element displayed on the user interface. For example, a user may say the word for an animal that is displayed as part of the prompt. In addition, the type of image presented to the user may depend on the set of candidate languages. For example, a particular image or set of images may be provided in order to distinguish between languages. The prompt may also include an image of a map and the user may specify a location on the map. For example, a user may specify a geographic location (e.g. where the user resides), which is used to determine a source language familiar to the user. In an implementation, the user may specify a continent, country, territory, city, town, and village. The device may then extrapolate a particular language spoken within the specified location. In another example, the user may say any word such as the user's name or other word and the device may determine a source language from analyzing the pronunciation of the word and/or particular accents.

The response may also include any other form of suitable input such as performing a selection of an element on the user interface. For example, the user may manipulate a cursor on the interface with an input device such as a mouse or touch sensitive screen. For example, the user may select a region on a map as described above. In addition, other visual elements may also be selected such as a flag or other element corresponding to a selectable language.

In 306, a language may be determined based on the provided first response. The determined language provides a mechanism to communicate in a language that is familiar to the user. The determined language may be referred to and correspond to an initial language, main language, source language, language family, macro language, and the like. As described further herein, the determined language may include sub-languages including one or more variants or dialects. Various techniques may be employed when determining a language based on the type of response provided. For example, when the response includes a speech input, one or more words of an utterance may be analyzed using a suitable language recognition technique.

In order to determine a language, the device may store or access from a remote source, a list of languages from a language database. The language database may organize languages using various classification systems. For example, the language database may include or organize languages according to a standardized classification system. The standardized classification system may be defined by a standards organization or may be based on other sources such as publications, registers, or other language classification systems. A standardized language classification system may include the International Standards Organization (ISO) 639 family of standards, which provide a standard set of language codes. This family of standards may include ISO 639-1 to 639-6 versions and additional or future 639-x versions. Another example of a standardized system is the Internet Engineering Task Force (IETF) language tags classification system. As another example, a language classification system may be based on Ethnologue, which provides statistics for world languages and dialects. In yet another example, a language classification system may be based on various registers such as the Linguasphere Observatory research network.

The language database may include a list of languages or organize languages based on one or more of these classification systems. For example, the language database may be organized based on a hierarchical classification scheme. For example, standardized classification systems typically include a first tier of languages (e.g. language family) and one or more lower tiers of sub-languages (e.g. dialects). In an implementation, the database may organize the list of selectable languages hierarchically based on a standardized classification system as described above. For example, ISO 639 macro languages or language families may correspond to the determined language as described in 306 and a determined dialect or sub-language (e.g. as determined in 312) may correspond to language falling under a macro language or language family as defined in ISO 639. Similarly, a classification system based on the IETF language tag system may include a hierarchical organization of a language. For example, Brazilian Portuguese may be represented as a "pt-BR" language tag under the IETF classification system. The determined language in 306 may correspond to "pt" or Portuguese and the determined sub-language in 312 may correspond to "BR" or Brazilian Portuguese. In other implementations, the device may classify languages based on a modified standardized classification system or a proprietary classification system. For example, the classification system may be based on a number of languages wherein each tier is generalized based on geography or organized in a manner to provide an efficient selection process for a user. For example, languages may be organized in groups or tiers in order to balance the number of available selections for each response. In addition, the interface may combine or generalize certain languages depending on the degree of specificity required by the user or user interface.

Figure 6:
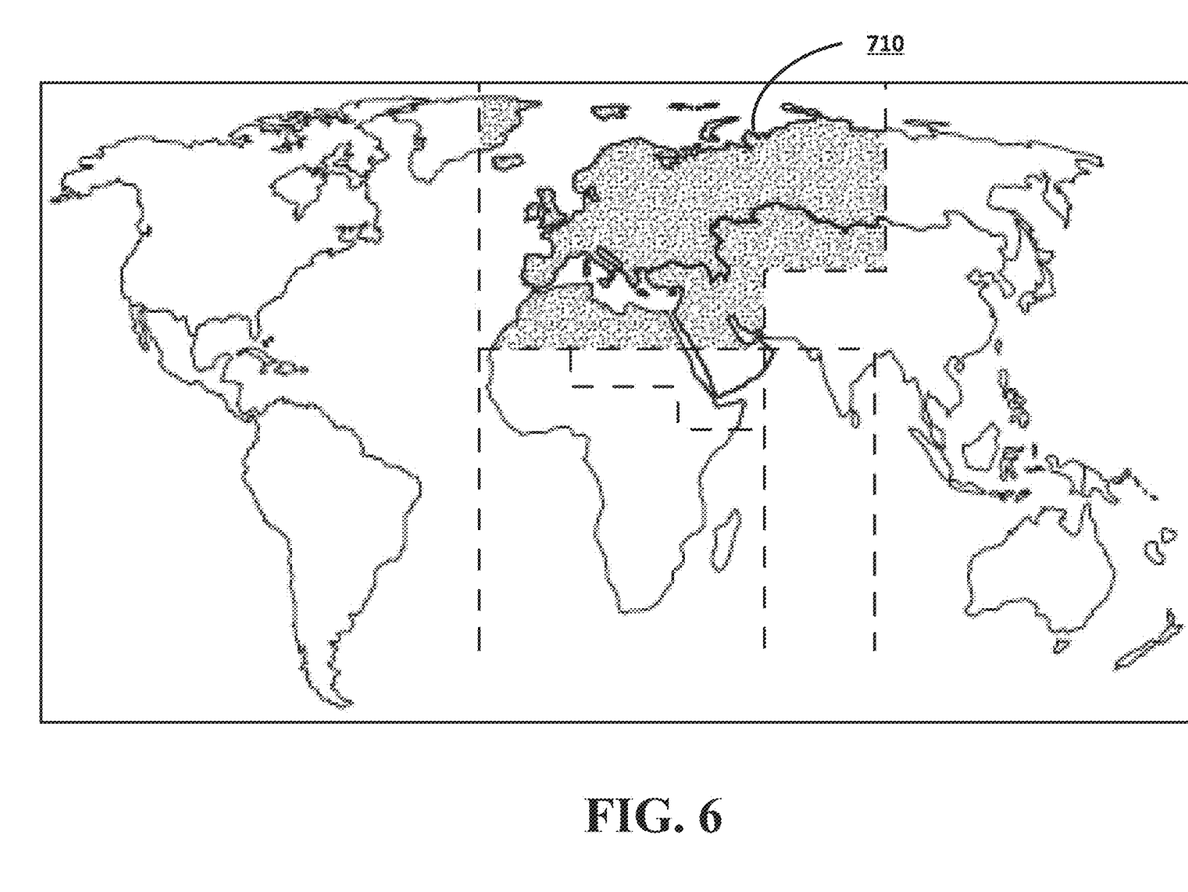
FIG. 6 illustrates an example of a map delimited into regions based on geographic areas according to an implementation of the disclosed subject matter.

FIG. 6 illustrates an example of a map delineated into regions based on geographic areas according to an implementation of the disclosed subject matter. For example, as shown the regions may be organized in a manner based on continental regions. For example, the regions may include Africa, Americas, Asia-Pacific, Europe, and the Middle East.

Figure 7:
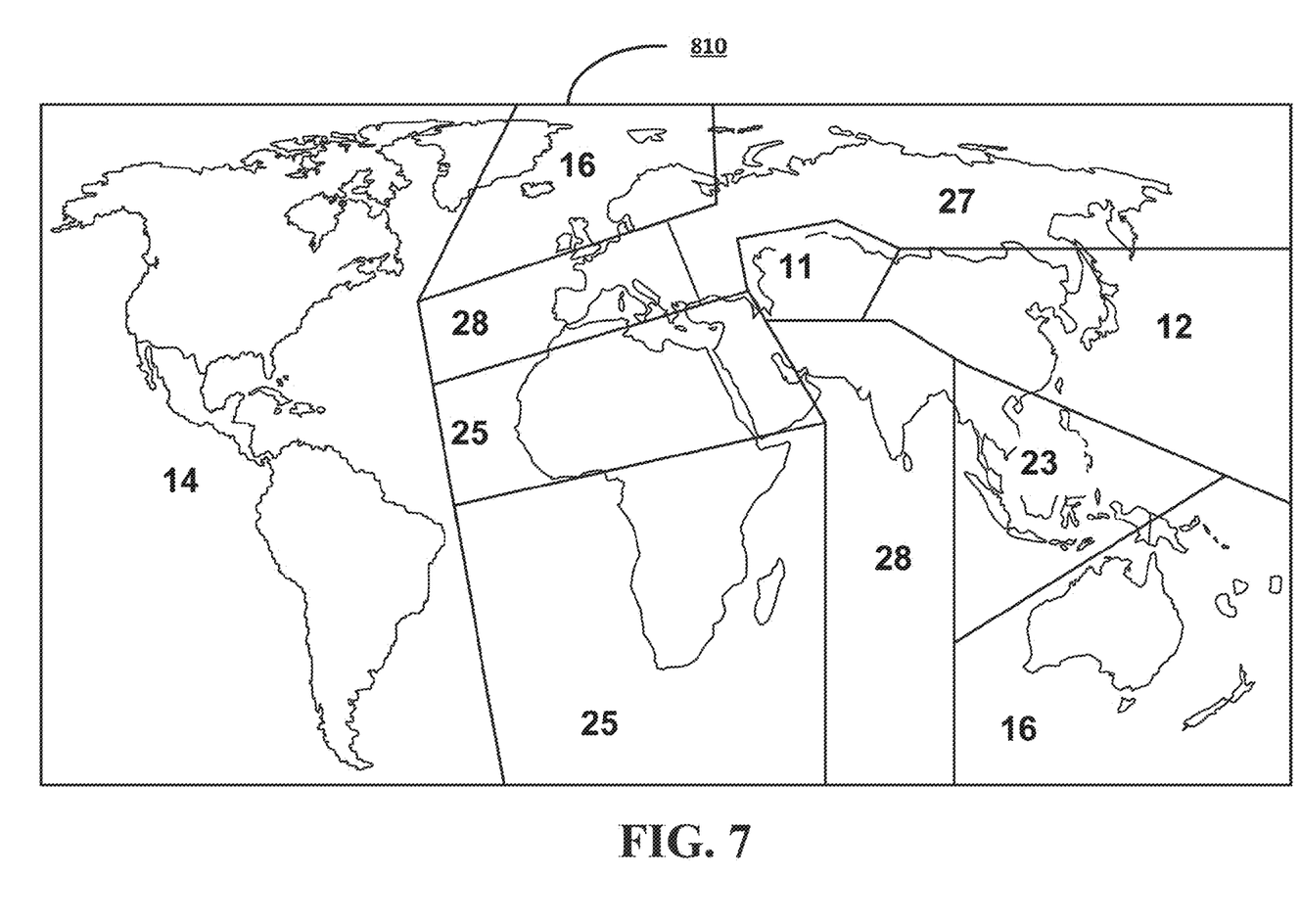
FIG. 7 illustrates an example of a map delineated into regions based on a number of languages spoken within the regions according to an implementation of the disclosed subject matter.

FIG. 7 illustrates an example of a map delineated into regions based on a number of languages spoken within the regions according to an implementation of the disclosed subject matter. As shown, a map may be divided into regions based on a predefined number of languages spoken within each region. As shown, the map is not delineated based on country or continental boundaries.

Returning to FIG. 3, in 308, the device may provide on the user interface language elements in the determined language prompting the user to provide a subsequent or second response. The user interface may be updated using language elements such as words or characters in the language determined in 306. By providing an initial amount of information in the form of a first response, the device may communicate with the user in a language that the user presumably understands. This provides the ability for the user interface to elicit more detailed information from the user. Accordingly, specific instructions may be communicated to the user in the form of an additional prompt. The language elements may include words or characters written in the determined language (e.g. native language script), or may include language elements in another language. The characters may include letters, numbers, punctuation, accents, diacritic, and other symbols or expressive text or script that may be used in a particular language or alphabet. The words or characters may also include logograms (or logographs) that are graphemes representing a word or a morpheme. For example, logograms are used as characters in Chinese-based languages.

As described above in 302, the device may prompt the user in various ways. In one example, the interface may provide audio instructions in the determined language. For example, if the determined language is English, the device may provide the audio instruction "Please specify the type of English." In another example, the device may provide the audio instruction "Where are you from?" in order to determine a regional sub-language of English (e.g. British English vs. American English). In another example, the prompt may include a set of images with captions written in each of the candidate languages. In response, the user may select a preferred caption, which in turns determines a language.

The device may also prompt the user to make a selection of a user interface element. For example, the user interface may provide a list of selectable languages from which the user may select a particular language. In addition, the user may be provided with a map in order to select a region within the map. For example, the user may select a sub-region of a map corresponding to a regional language. A map may be delineated into one or more selectable regions based on various criteria as described herein. For example, these regions may be delineated based on country boundaries, language boundaries, or other suitable criteria. When updating the user interface, the portions of the interface or screen may be updated as well as providing one or more new screens.

Figure 8:
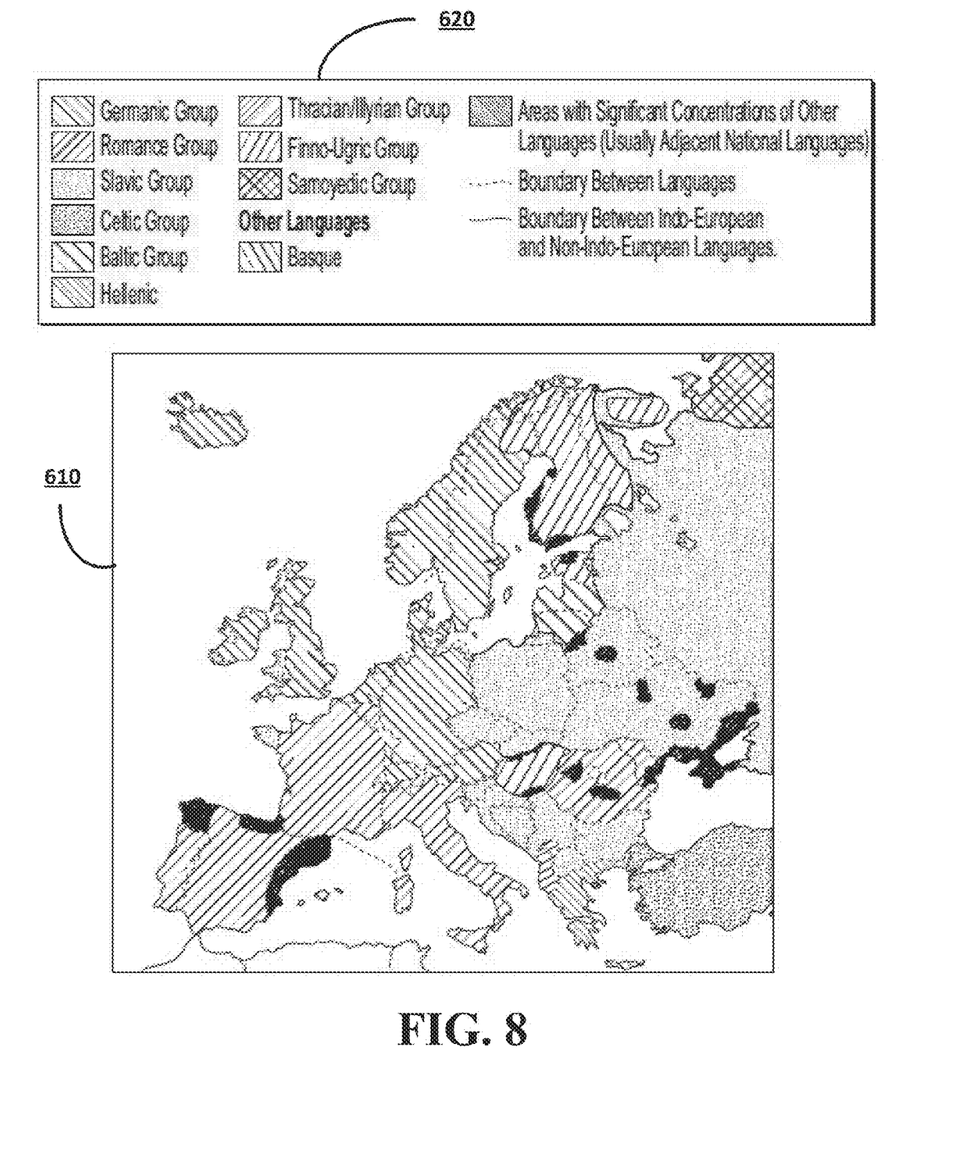
FIG. 8 illustrates an example of a map of a selected region delineated into sub-regions based on languages spoken within the sub-regions according to an implementation of the disclosed subject matter.

FIG. 8 illustrates an example of a map of a selected region delineated into sub-regions based on languages spoken within the sub-regions according to an implementation of the disclosed subject matter. For example, if an initial map includes a portion of Europe as a selectable region, a second map as shown in FIG. 8 may be displayed. This second map or sub-map of the portion of Europe may be delineated into sub-regions as shown. Accordingly, a user may be prompted to select a specific region within Europe.

In 310, the user may provide a second response based on the particular type of prompt provided by the language elements in 308. The second response may include a response similar to those described in 304, but may be used to further determine a specific sub-language. Accordingly, the second response may provide the necessary information for the device to determine a sub-language to a high degree of specificity. For example, the user may provide a speech input specifying a particular word or pronunciation that allows the device to determine a particular dialect or variant.

For example, the device may distinguish between sub-languages based on analyzing phonemes defining the basic sounds of the language, which may vary based on the language or accent of the speech input. In one instance, the device may distinguish various types of English based on the phoneme for a short "o" sound, which is different in British English, American English, and Australian English. Accordingly, the user may be prompted to say a particular word that that may be different or pronounced differently amongst sub-languages in order to distinguish a language preference of the user.

A variant may include a regional variant of a language. For example, English may include regional variants such as Canadian English, British English and American English. In an implementation, a user may be provided with multiple regional variations that may not be distinguishable. For example, a user may reside in Canada, and accordingly, may be provided to select one of Canadian English, British English and American English. In such as instance, Canadian English may not differ from British English, but the user may still be provided the ability to choose Canadian English.

In 312, the device may determine a sub-language of the language based on the received second response. A sub-language may be determined using various techniques including those as described in 306. It should be noted that in some instances determining a sub-language may not be necessary as the first response may provide sufficient information to provide the required degree of language specificity. For example, a user selecting Mexico on a map as a first response may be sufficient for the device to determine that Spanish including any Mexican regional variant is preferred.

When determining a sub-language or a source language, the device may utilize efficient narrowing techniques. For example, a device deployed in Switzerland may show fr-Latn-CH (Swiss French), rm-Latn (Romansh), de-Latn-CH (Swiss Standard German), and it-Latn-CH (Swiss Italian), which are the official languages. A list of alternative languages may be based on other criteria such as popularly of languages written and/or spoken, which may be determined by census (Swiss language ranking) A list of languages may also be based on usage information such as web search history and/or other information.

In 314, the device may update the user interface to display language elements in the determined sub-language. This may include updating particular language elements in the determined sub-language or updating the user interface to display any subsequent language elements in the determined sub-language. It should be noted that additional prompts (e.g. third prompt) and additional responses (e.g. third response) may also be utilized for clarification or to provide further specificity for a language selection.

Figure 9A:
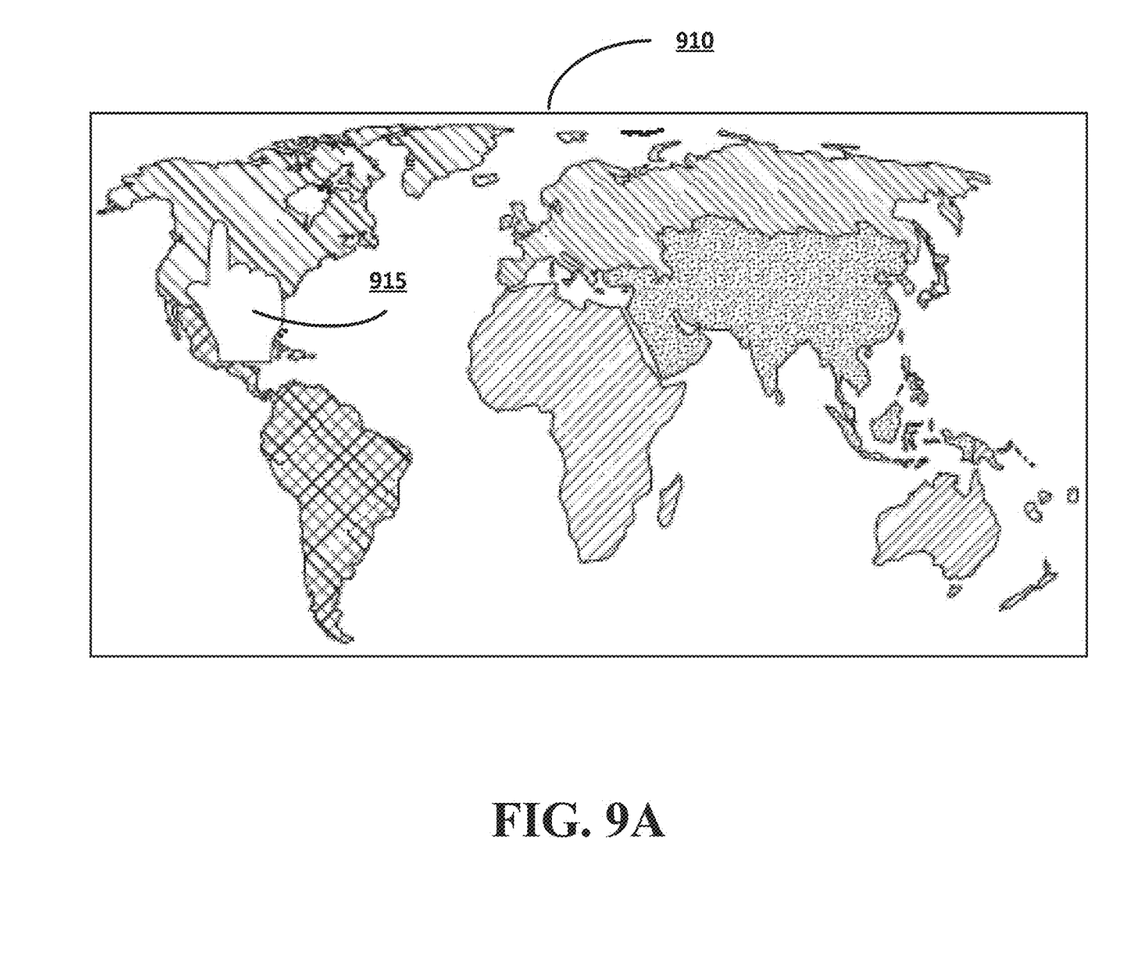
FIG. 9A illustrates an example of non-language elements including a map with selectable regions according to an implementation of the disclosed subject matter.
Figure 9B:
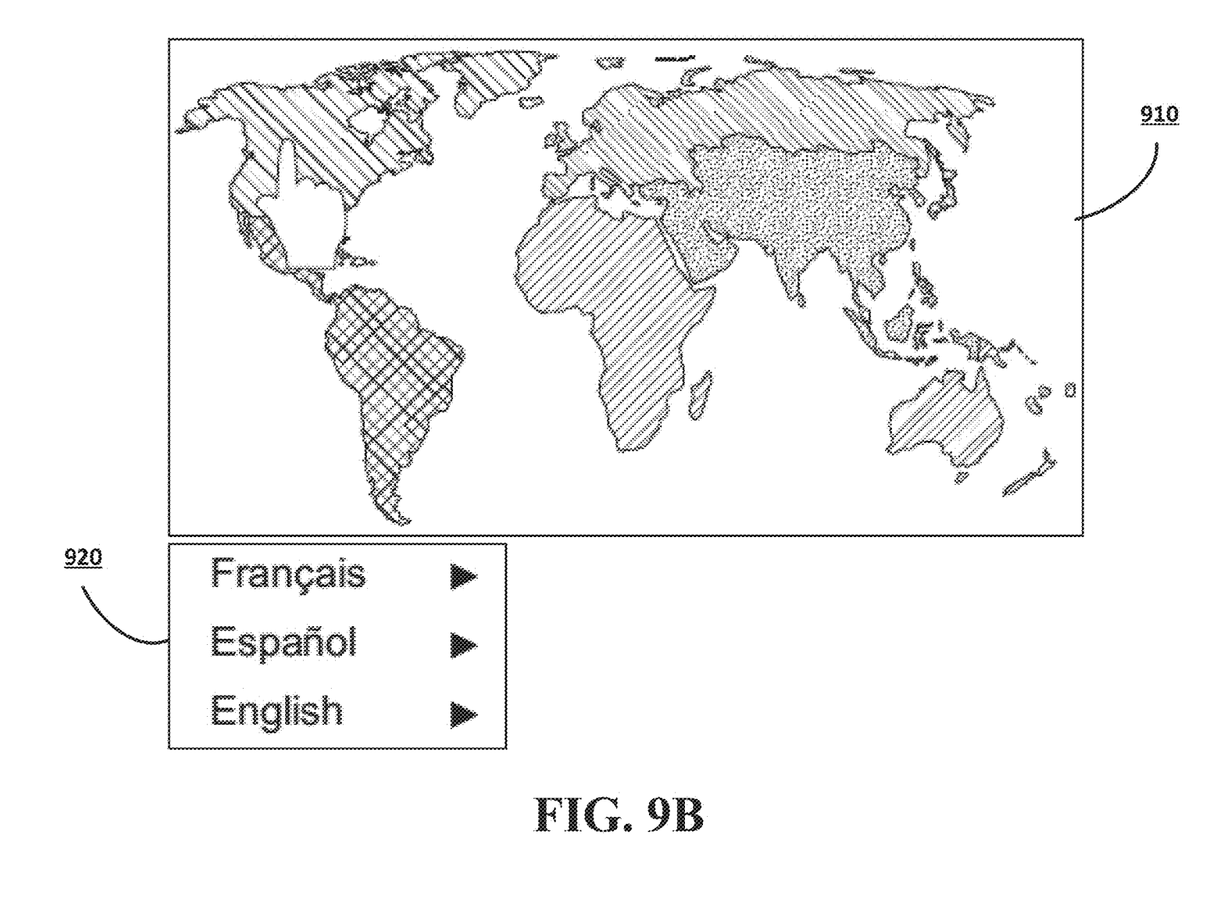
FIG. 9B illustrates the map of FIG. 9A with the addition of language elements including selectable languages according to an implementation of the disclosed subject matter.
Figure 9C:
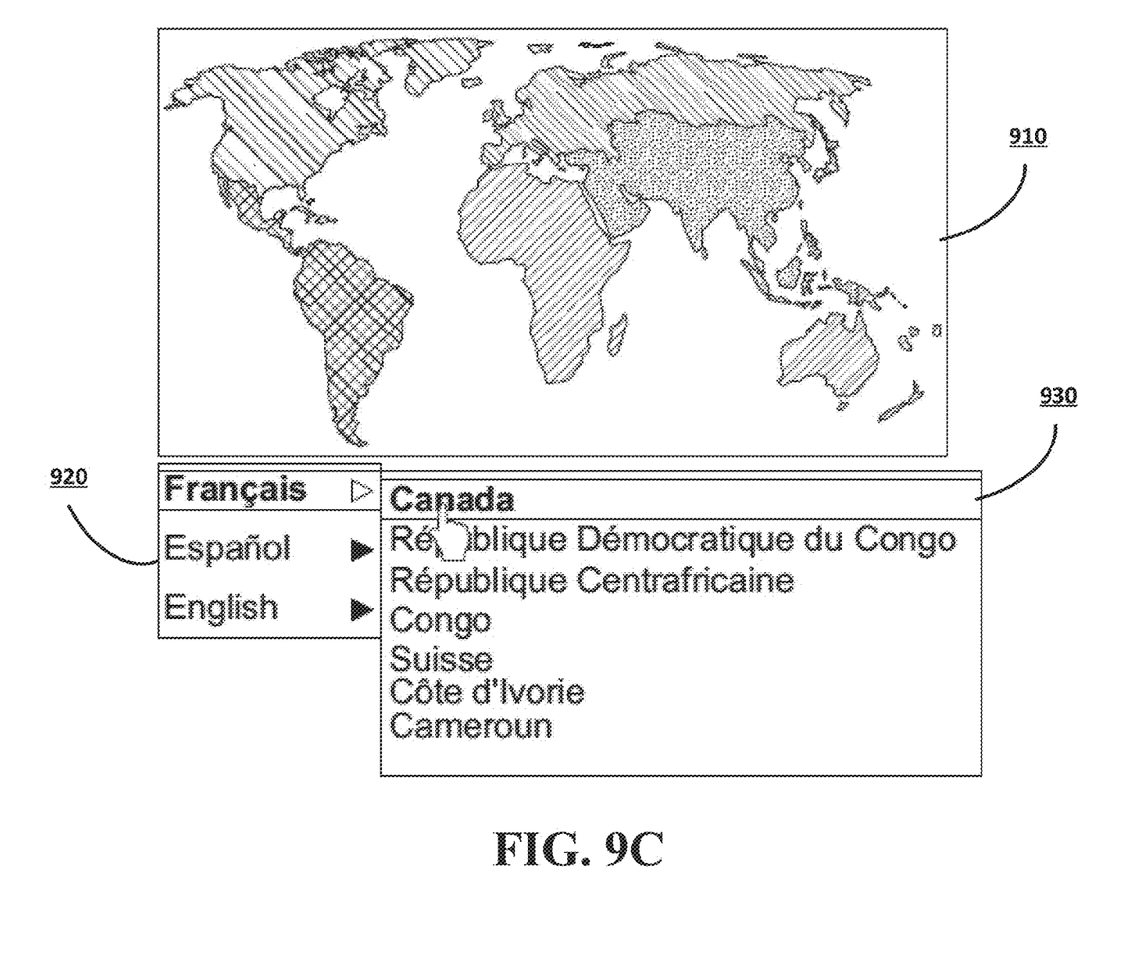
FIG. 9C illustrates the map and language elements of FIG. 9B with the addition of a list of selectable regional variants of a language according to an implementation of the disclosed subject matter.

FIG. 9A illustrates an example of non-language elements including a map with selectable regions according to an implementation of the disclosed subject matter. As shown, the user may select a region within the map (e.g. a region in which the user resides). In response, as shown in FIG. 9B, the map may provide language elements including selectable languages. As shown, the list of languages may include French (Francias), Spanish (Espanol), and English. The list of languages in this case may be written using native scripts as shown. As shown in FIG. 9C, if the user selects French, a list of regional variants of French may be listed. Accordingly, the user may select a specific regional variant, which in this case is Canada (or French-Canadian). Thus, a user may select a specific sub-language without having to navigate an unreasonably long list of languages.

Various implementations may include or be embodied in the form of computer-implemented process and an apparatus for practicing that process. Implementations may also be embodied in the form of a non-transitory computer-readable storage and/or memory containing instructions, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular step, feature, structure, or characteristic, but every implementation may not necessarily include the particular step, feature, structure, or characteristic. Moreover, such phrases are not necessarily referring to the same implementation. Further, when a particular step, feature, structure, or characteristic is described in connection with an implementation, such step, feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of establishing an interaction language for a user interface of a display, comprising:
   providing, on the user interface, non-language elements prompting a user to provide a first response;
   receiving, from the user, the first response;
   determining a language for the user based on the received first response;
   providing, on the user interface, language elements in the determined language prompting the user to provide a second response;
   receiving, from the user, the second response; and
   determining a sub-language of the determined language based on the received second response.

2. The method of claim 1, wherein the sub-language is a one of a dialect or a variant of the determined language.

3. The method of claim 1, wherein the non-language elements include one or more ideograms.

4. The method of claim 3, wherein the user interface does not display any language elements as part of the prompting the user to provide the first response.

5. The method of claim 1, wherein the language elements include one or more characters or words.

6. The method of claim 1, further comprising updating the user interface to display language elements in the determined sub-language.

7. The method of claim 1, wherein at least one of the received first response and the received second response includes a speech input.

8. The method of claim 1, wherein the non-language elements include an image and the received first response includes a speech input of one or more words describing the image.

9. The method of claim 1, wherein the non-language elements include a map and the received first response includes a speech input of one or more words specifying a location on the map.

10. The method of claim 9, wherein the specified location includes at least one of a continent, a country, a territory, a city, a town, and a village.

11. The method of claim 1, wherein the non-language elements include a first map delineated into regions, and wherein the received first response includes a selection of one of the regions.

12. The method of claim 11, wherein the first map is delineated into regions based on one or more countries within the regions.

13. The method of claim 11, wherein the first map is delineated into regions based on one or more languages spoken within the regions.

14. The method of claim 11, wherein the first map is delineated into regions based on a number of languages spoken within the regions.

15. The method of claim 11, further comprising providing, on the user interface and in response to the selection of one of the regions, a second map of the selected region delineated into sub-regions, and wherein the received first response further includes a selection of one of the sub-regions.

16. The method of claim 15, wherein the second map of the selected region is delineated into sub-regions based on one or more languages spoken within the geographic sub-regions.

17. The method of claim 1, wherein the determined language is selected from a list of languages based on an ISO 639 family of standards.

18. The method of claim 1, wherein the determined sub-language is selected from a list of sub-languages associated with the determined language.

19. A computer-implemented method of establishing an interaction language for a user interface of a display, comprising:
   providing, on the user interface, non-language elements prompting the user to provide a first response;
   determining a language for the user based on the first response provided by the user;
   prompting, in the determined language, the user to provide a second response;
   determining a sub-language of the determined language based on the second response provided by the user.

20. The method of claim 19, wherein the prompting the user to provide the second response includes providing an audible instruction in the determined language.

21. The method of claim 19, wherein the prompting the user to provide the second response includes prompting the user to say a specific word and the second response received from the user includes the specific word as a speech input, and wherein the determining the sub-language includes determining a regional variant of the determined language based on a pronunciation of the specified word as the speech input.

22. The method of claim 19, wherein the sub-language is a one of a dialect or a variant of the determined language.

23. The method of claim 19, wherein the user interface does not display any language elements as part of the prompting the user to provide the first response.

24. A device for establishing an interaction language for a user interface, comprising:
   a processor, the processor configured to:
      provide, on the user interface of a display coupled to the device, non-language elements prompting a user to provide a first response;
      receive, from the user, the first response;
      determine a language for the user based on the received first response;
      provide, on the user interface of the display, language elements in the determined language prompting the user to provide a second response;
      receive, from the user, the second response; and
      determine a sub-language of the determined language based on the received second response.

* * * * *